Nov. 4, 1969  P. DE VINCENT  3,476,897
STEERING WHEEL
Filed Feb. 12, 1968
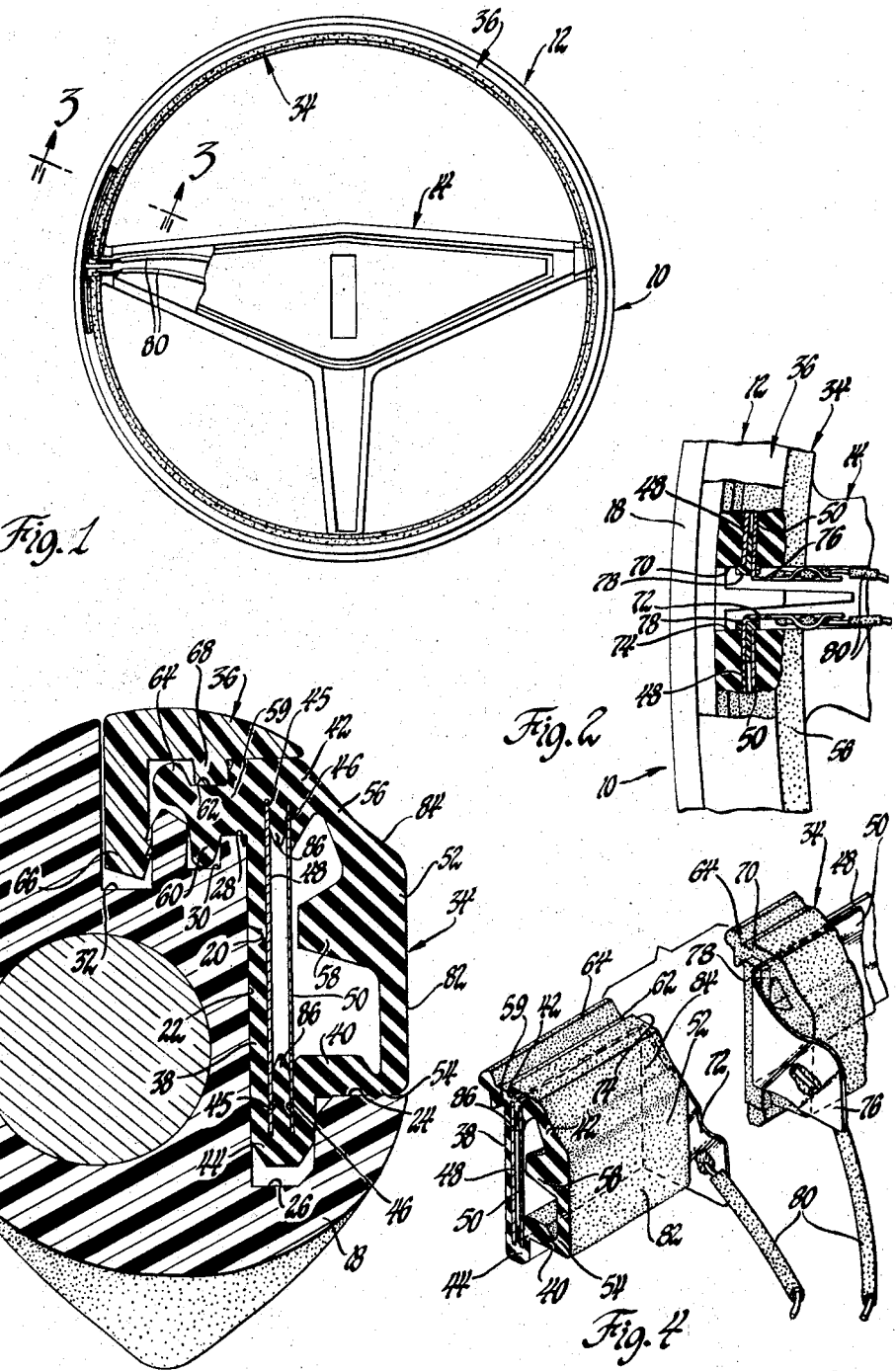
INVENTOR.
Patsy DeVincent
BY
Herbert Furman
ATTORNEY

United States Patent Office 3,476,897
Patented Nov. 4, 1969

3,476,897
STEERING WHEEL
Patsy De Vincent, Dayton, Ohio, assignor to General Motors Corporation, Detroit, Mich., a corporation of Delaware
Filed Feb. 12, 1968, Ser. No. 704,797
Int. Cl. H01h 9/20, 9/54
U.S. Cl. 200—67.57    8 Claims

ABSTRACT OF THE DISCLOSURE

A steering wheel includes a rim portion having a continuous recess opening to both the inner and the upper side of the rim. An elongated extruded housing of resilient plastic material fits within the recess and is interlocked with the walls of the recess by various ribs and grooves. A semi-rigid locking strip overlies one of the side walls of the housing and is also interlocked with the recess. A pair of thin flat spaced contact strips have their side edge portions slidably supported in slots provided in the side walls of the housing, with one of the strips being backed up by the base wall of the housing and the other strip being thinner than the one strip. The integral actuating portion of the housing is hinged to the side walls and includes an elongated rib, with the actuating portion and the rib being located in spaced relationship to the thinner contact strip. The actuating portion is engageable by minimum finger pressure from either the upper or the inner side of the rim to swing the actuating portion about its hinge portions and move the rib thereof into engagement with the thinner contact strip intermediate the side edge portions of this strip to bow this intermediate portion into engagement with the other strip and complete a current path between the strips. One end of each strip is bent laterally and projects outwardly of one end wall of the extruded housing, with this end wall being plugged to seal the interior of the housing against dust and dirt. The bent ends of the strip are connected across the source of power.

---

This invention relates to steering wheels, and more particularly to a horn blowing arrangement for vehicle steering wheels.

A major object of this invention is to provide a horn blowing arrangement for steering wheels which includes an elongated extruded closed housing of soft resilient material mounting a pair of thin flat contact strips in precision spaced relationship to each other and including an integral actuating portion located in precision spaced relationship to one of the strips and engageable only with an intermediate portion of the one strip regardless of the direction of finger pressure to bow the intermediate portion of the one strip into engagement with the other strip.

Another major object of this invention is to provide such an arrangement wherein the actuating portion is easily movable by minimum finger pressure applied in any direction from the inside of the rim or from the upper side of the rim and at any point on the rim. A further major object of this invention is to provide such an arrangement which includes a locking strip interlocked with the rim of the wheel to hold the housing within a recess in the rim and bar any engagement with the walls of the housing mounting the contact strips. Yet another major object of this invention is to completely seal the housing from dust, dirt and other ambient conditions to provide for trouble-free, long-life operation.

In the preferred embodiment of this invention, a spaced pair of thin flat contact strips have their side edge portions received within slots in the opposite side walls of an elongated extruded closed housing of resilient plastic material to exactly space the strips and protect the strips against dust, moisture, and other ambient conditions. The side walls of the housing are connected by thin integral hinge portions with an actuating cover which is extruded with the housing and includes an integral rib on the inner side thereof. Both the actuating portion and the rib are located in spaced relationship to one of the strips which is of much thinner material than the other strip.

One side wall of the housing seats against a wall of a recess which extends continuously about the inner side of the rim of the steering wheel. The other side wall of the housing is covered by a decorative locking strip of harder material than the housing so that both side walls of the housing are enclosed within the steering wheel to prevent the operator from cutting the walls by pressing them against the side edges of the strips.

The actuating portion may be engaged from either the upper or the inner side of the rim, and finger pressure may be applied at any place on the periphery of the rim and at any angle to the actuating portion to move the actuating portion about the integral hinge portions and cause the rib thereof to bow the one strip into engagement with the other strip.

By locating the actuating portion and the rib thereof in spaced relationship to the one contact strip, the one contact strip is either normally engaged or wipingly engaged intermediate the edges thereof and in substantially the same area at all times so that this one contact strip bows or flexes without taking a permanent set. Additionally, only minimum finger pressure is required regardless of the point and the angle at which the pressure is applied. Additionally, the strip is lubricated so that the side edges slide or slip relative to the slots in the side walls of the housing when the strip bows.

By having the housing extend continuously around the periphery of the steering wheel, the horn can be blown by finger pressure applied at any point on the wheel. Of course the strip could extend for less than the full periphery of the wheel or be located on the spokes of the wheel but the full advantages would not then be attained.

Other objects and features of the horn blowing arrangement of this invention will be apparent from the following description and drawings wherein:

FIGURE 1 is an elevational partially broken away view of a steering wheel embodying a horn blowing arrangement according to this invention;

FIGURE 2 is an enlarged broken away view of a portion of FIGURE 1;

FIGURE 3 is an enlarged sectional view taken generally along the plane indicated by line 3—3 of FIGURE 1; and FIGURE 4 is an enlarged perspective view of a portion of FIGURE 2.

Referring now to FIGURE 1, a conventional steering wheel designated generally 10 includes a rim portion 12 and a spoke portion 14. While the details of the rim and spoke portions form no part of this invention, the rim portion, as best shown in FIGURE 3, conventionally includes a metal core 16 which is covered with a plastic or rubber portion 18 which is molded about the core. The molded portion 18 includes a continuous inwardly and upwardly opening peripheral recess 20. The recess 20 includes a base wall 22, a lower side wall 24 extending generally normal to the base wall 22 and including a groove 26, and an upper side wall 28 which also extends normal to the base wall 22 and includes spaced grooves 30 and 32. Preferably the various walls and grooves are formed in the rim 12 when the portion 18 of the rim is molded about the core 16.

The horn blowing arrangement includes an elongated housing 34 which fits within the recess 20, as will be hereinafter described, and is held therein by a locking strip 36. As shown in FIGURE 1, the housing 34 and the strip 36 extend around the full periphery of the rim portion of the steering wheel. While the full advantages of the arrangement of this invention are obtained by having the housing so extend, it should be noted that it can extend for less than the full periphery of the rim portion 12 and can also be applied to other portions of the wheel 10, such as the spoke portion 14.

The housing 34 is of extruded resilient plastic material and includes a base wall 38 and side walls 40 and 42 which extend from the opposite edges of the base wall 38. The side wall 40 includes an integral extension or rib 44 and this rib and the wall 42 are each provided with closely spaced slots 45 and 46, the respective slots 45 and 46 being aligned with each other. A first thin flat contact strip 48 has its side edge portions received within the slots 45 and engages the base wall 38 of the housing. A second flat contact strip 50, which is much thinner than the strip 48, has its side edges received within the slots 46 to thereby mount both strips within the housing in closely spaced relationship to each other. The strips 48 and 50 extend for the length of the housing 34. In the specific embodiment shown, these strips are of spring material which will conduct an electric current, such as brass or spring copper, with the strip 48 being .007 inch thick, the strip 50 being .003 inch thick, and the spacing between the strips being .025 inch. The housing 34 is extruded from resilient plastic material and the side edges of the contact strips would normally be gripped by the side walls of the slots 45 and 46. Since it is desirable that the side edges of the strip 50 be movable in the slots 46, as will be hereinafter described, these side edges are lubricated with a suitable material before the strip is inserted within the housing 34 from one of the ends thereof. By lubricating at least the side edges of the strip 50 and also the strip 48, the strips may be easily inserted from one end of the housing 34 after the housing has been extruded and cut to lengths and the strips cut to the proper length.

The housing 34 further includes an integral cover or actuating portion 52 which extends between and is respectively connected to the side walls 40 and 42 by integral necked down or thin hinge portions 54 and 56. The actuating portion is spaced from the strip 50 and includes an inwardly tapered elongated rib 58 which is spaced a minimum distance from the contact strip 50, such as .009 inch.

The extension 44 of the housing is received within the groove 26 of the rim portion 12 to interlock the lower wall of the housing 34 and the rim portion. It will be noted that it is impossible to engage the extension 44 once it is within the groove 26. This prevents the operator from cutting the extension by pressing it against the edges of the strips 48 and 50, which are rather sharp. The base wall 38 of the housing seats against the base wall 22 of the recess and backs up the strip 48 which seats against the wall 38. The side wall 42 of the housing includes a lateral extension 59 which is provided with a rib 60 received within the groove 30 of wall 28, a groove 62 opposite the rib 60, and a peripheral rib 64.

The locking strip or member 36 includes an integral extension 66 of generally rigid extruded plastic which is received within the groove 32 to thereby interlock the locking strip and the rim portion 12. The extension 66 may be solvent welded to the walls of the groove 32 and may be provided with integral thin flexible fins on either one or both walls to enhance the grip between the extension and the walls of the groove 32. The locking strip 36 includes an integral rib 68 which fits within the groove 62 of extension 59 and forces this extension against the wall 28 of the recess and additionally forces the rib 60 within the groove 30. It should be noted that the locking strip overlies both the extension 59 and the wall 42 of the housing so that the operator cannot press against the wall 42 and thereby cut this wall by forcing it against the side edges of the strips 48 and 50.

Preferably, the housing 34 is extruded linearly and the strips 48 and 50 are inserted into the housing after extrusion. As shown in FIGURES 2 and 4, one edge of the strip 48 terminates at one end wall 70 of the housing 34 and the other end of the strip 48 includes a laterally bent end 72 at the other end wall 74 of the housing. Likewise one end of the strip 50 terminates at the other end wall 74 of the housing 34 while the other end of the strip 50 includes a laterally bent end 76 at the one end wall 70 of the housing 34. Plastic spacer members 78 fit between the ends of the strips to prevent short-circuiting and each includes a slotted flanged head which fits against the end walls 70 and 74 of the housing 34 to seal the ends of the housing against dust and dirt. The laterally bent ends of the strips 48 and 50 are soldered to wires 80 which conventionally connect the strips 48 and 50 across the source of power. These wires may extend through a passage or recess provided in the spoke portion 14 to the hub portion, not shown, of the steering wheel and then across the source of power.

It will be noted that the recess 20 opens to both the inner side of the rim portion 12 and also to the upper side and that the exposed actuating portion 52 is accessible to operator finger pressure from either of the sides of the rim and at any angle as well as at any point on the rim. The actuating portion includes a first engageable surface 82 which is easily accessible from the inside of the rim and a second actuating surface 84 which is angular to the surface 82 and is accessible from either the inner side of the rim or from the upper side of the rim. If the finger pressure is applied normal or substantially normal to the surface 82, the actuating portion will be moved to the left about the hinge portions 54 and 56 to bring the rib 58 into engagement only with the intermediate portion of the strip 50 and bow this intermediate portion into engagement with the strip 48. Since only the rib 58 engages the strip 50 and further engages the strip 50 only intermediate the side edge portions thereof, only minimum finger pressure, such as two to four pounds, will be required to bow the strip 50. The minimum finger pressure is also attained by making the strip 50 as thin as possible.

By bowing the strip 50 only intermediate the side edge portions thereof, the strip will not take a permanent set. This is important in view of the minimum spacing between the strips 48 and 50. The lubrication of the side edge portions of the strip 50 of course aid in the bowing of the strip and, additionally, it will be noted that the thin wall portions 86 of the side walls 40 and 42 which space the strips are tapered to further aid in permitting the strip 50 to bow without taking a permanent set.

If the finger pressure is applied against the wall 84 from either the inner side or the upper side of the rim or is applied angularly to the surface 82, the actuating portion 34 will again be moved into engagement with the strip 50 as it moves about the hinge portions 54. However, instead of the rib 58 moving directly into engagement with the strip 50, it will wipingly engage this strip. However this wiping engagement will be in the same general area of engagement with the strip 50 as if the rib 58 were moved directly or generally normally into engagement with the strip 50 so that, again, this strip will bow intermediate the side edge portions thereof without taking a permanent set.

Thus this invention provides an improved horn blowing arrangement.

I claim:

1. A steering wheel having a recess, an elongated closed housing of resilient material located within the recess, the housing including a base wall and a pair of spaced side walls extending from the base wall, a pair of elongated strips of current conducting material, means mounting the side edge portions of each strip on the spaced side walls to mount the strips within the housing in closely spaced relationship, an actuating portion extending between the side walls in spaced relationship to one strip and having the edge portions thereof connected to the side walls by integral hinge portions thinner than the actuating portion and side walls, the actuating portion having an elongated rib generally intermediate the edge portions thereof located in adjacent spaced relationship to the one strip, the actuating portion being movable about the hinge portions by pressure applied generally normal thereto to move the rib thereof generally normal to and into engagement with an intermediate portion of the one strip, the actuating portion being movable about the hinge portions by pressure applied generally angularly thereto to move the rib thereof generally angularly to and into wiping engagement with an intermediate portion of the one strip, engagement of the rib with the intermediate portion of the one strip bowing the intermediate portion into engagement with the other strip to complete a current path between the strips, and means for retaining the housing within the recess of the steering wheel.

2. The combination recited in claim 1 wherein one side wall of the housing is enclosed by a portion of the steering wheel defining the recess and the other side wall is open to the exterior of the wheel, the retaining means including a locking member secured to the steering wheel and enclosing the other wall of the housing to thereby bar any engagement with either side wall of the housing from the exterior of the steering wheel.

3. The combination recited in claim 1 wherein the one strip adjacent the elongated rib of the actuating portion is thinner than the other strip to provide for minimum required pressure on the actuating portion to move the actuating portion about the hinge portions and bow the intermediate portion of the one strip.

4. The combination recited in claim 1 wherein each side wall includes a pair of closely spaced slots, the slots being aligned transversely of the base wall and receiving the side edge portions of the strips, the material of the wall intermediate the slots being tapered to aid in permitting the intermediate portion of the one strip to bow without taking a permanent set.

5. The combination recited in claim 4 wherein the slots in one side wall of the housing are located in an extension thereof received within a complementary groove projecting from a wall of the recess to interlock the housing and the steering wheel, the other side wall of the housing including an extension overlying a wall of the recess, and the retaining means includes a locking member overlying said last-mentioned extension and said other side wall and secured to the steering wheel to thereby enclose both side walls of the housing and bar any engagement therewith from the exterior of the wheel.

6. The combination recited in claim 1 wherein the actuating portion includes a first surface located in generally parallel relationship to the strips and a second surface located angularly of the first surface, the first surface facing radially inwardly of the rim portion of the steering wheel and the second surface facing generally radially inwardly and axially outwardly of the rim portion of the steering wheel.

7. The combination recited in claim 1 wherein one end of each strip extends outwardly of one end of the elongated housing for connection across a source of power, and means for spacing the ends of the strips relative to each other at each end of the housing and supporting the outwardly extending ends of the strips.

8. A steering wheel having a recess, an elongated closed housing of resilient material located within the recess, the housing including a base wall and a pair of spaced side walls extending from the base wall, a pair of elongated strips of current conducting material, means mounting the side edge portions of each strip on the spaced side walls to mount the strips within the housing in closely spaced relationship, an actuating portion extending between the side walls in spaced relationship to one strip and including a first part extending generally parallel to the one strip and a second integral part extending generally angularly to the one strip, each part having the edge portion thereof connected to a respective one side wall by an integral hinge portion thinner than the part and one side wall, the actuating portion having an elongated rib on the first part thereof located in adjacent spaced relationship to the one strip, pressure applied to the first part of the actuating portion moving the actuating portion about the hinge portions and moving the rib thereof generally normal to and into engagement with an intermediate portion of the one strip, pressure applied to the second part of the actuating portion moving the actuating portion about the hinge portions and moving the rib thereof generally angularly to and into wiping engagement with the intermediate portion of the one strip, engagement of the rib with the intermediate portion of the one strip bowing the intermediate portion into engagement with the other strip to complete a current path between the strips, and means for retaining the housing within the recess of the steering wheel.

References Cited

UNITED STATES PATENTS

| | | | |
|---|---|---|---|
| 2,025,977 | 12/1935 | Getty | 74—552 XR |
| 2,025,980 | 12/1935 | Getty | 200—61.57 |
| 2,796,484 | 6/1957 | Wolf | 200—61.57 |
| 2,823,279 | 2/1958 | Schulenburg | 200—86 |
| 2,850,591 | 9/1958 | Salvador | 200—61.57 |
| 2,943,164 | 6/1960 | Kniffin | 200—61.57 |

FRED C. MATTERN, Jr., Primary Examiner

F. D. SHOEMAKER, Assistant Examiner

U.S. Cl. X.R.

74—552